United States Patent [19]

Siegemund

[11] 3,899,531
[45] Aug. 12, 1975

[54] PROCESS FOR THE PREPARATION OF FLUORINE CONTAINING CARBONYL DIHALIDES

[75] Inventor: Günter Siegemund, Hofheim, Taunus, Germany

[73] Assignee: Hoechst Aktiengesellschaft, Frankfurt am Main, Germany

[22] Filed: Dec. 12, 1973

[21] Appl. No.: 424,118

[30] Foreign Application Priority Data
Dec. 14, 1972 Germany............................ 2261108

[52] U.S. Cl. ............................. 260/544 F; 423/468
[51] Int. Cl.² ..................... C07C 51/58; C01B 17/45
[58] Field of Search.......... 423/416, 468; 260/544 F

[56] References Cited
UNITED STATES PATENTS

| | | | |
|---|---|---|---|
| 3,102,139 | 8/1963 | Lawlor et al. .................. | 260/544 F |
| 3,725,475 | 4/1973 | Paucksch et al. ............... | 260/544 F |

*Primary Examiner*—Earl C. Thomas
*Attorney, Agent, or Firm*—Curtis, Morris & Safford

[57] ABSTRACT

Carbonyl dihalides COFX (where X is F, Cl or Br) are obtained by reaction of a perhalomethane CFXYZ (where Y and Z are Cl or Br) with sulfur trioxide. The reaction may be catalyzed by the presence of sulfuric acid and/or heavy metal salts such as mercury salts.

3 Claims, No Drawings

PROCESS FOR THE PREPARATION OF FLUORINE CONTAINING CARBONYL DIHALIDES

The present invention relates to a process for the preparation of fluorine containing carbonyl dihalides.

It is known to prepare carbonyl dihalides COXY, where X and Y each may be F, Cl or Br, by reaction of CO with halogen or inter-halogen compounds. Thus, for example, the following reactions are possible:

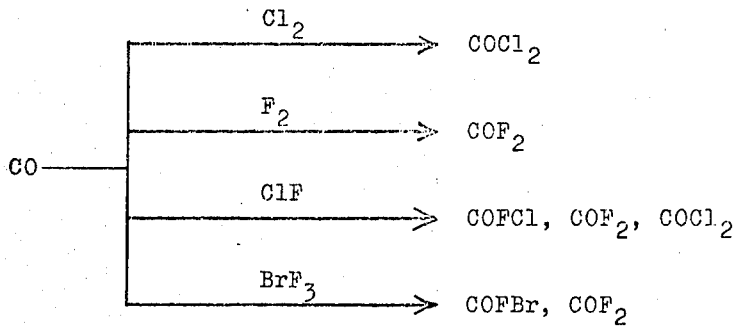

According to this process, however, only carbonyl dichloride (phosgene) can be easily obtained because of the accessibility of chlorine and the possibility of operating with conventional apparatus equipment, while reactions with fluorine, chlorofluoride or bromotrifluoride, substances which are difficult to prepare and to handle, require special operational methods and special materials for the reaction vessels.

Different processes have therefore been developed which avoid using the expensive $F_2$, ClF and $BrF_3$ compounds. Besides the electrofluorination of CO in anhydrous hydrogen fluoride to form $COF_2$, these processes are always based on the principle of replacing the chlorine in the phosgene ($COCl_2$) by fluorine either by electrochemical methods in liquid hydrogen fluoride or by chemical methods by reaction with hydrogen fluoride or metal fluorides. These processes, however, yield generally mixtures of $COF_2$, COFCl and $COCl_2$ which compounds have to be separated by distillation. Furthermore, these reactions require special apparatus equipment made of materials resistant against HF, and also all special measures necessary for handling hydrogen fluoride.

The present invention now provides a process for the preparation of carbonyl dihalides of the formula $$COFX \quad (I)$$

wherein X is fluorine, chlorine or bromine, by reaction of perhalomethanes of the formula $$CFXYZ \quad (II)$$

wherein X is fluorine, chlorine or bromine, Y and Z each are chlorine and/or bromine with the restriction that in case of x being fluorine Y and/or Z are bromine, and in case of X being bromine Y and Z are also bromine, with sulfur trioxide, optionally in the presence of sulfuric acid or a catalyst on the basis of mono- or bivalent heavy metal salts or mixtures thereof, at temperatures of from −10° to +100°C, preferably from 0° to 80°C, especially in the range of from 20° to 60°C.

Since it is known that carbon tetrachloride ($CCl_4$) is converted to phosgene ($COCl_2$) by reaction with $SO_3$ or oleum — with ir without catalysts — only at temperatures above the boiling point of $CCl_4$, is very surprising to observe that the fluorine containing perhalomethanes of formula II being of much greater stability can be subjected also to this reaction and even at considerably lower temperatures.

The reaction is preferably carried out in the absence of solvents. Solutes such as $SO_2Cl_2$, $S_2O_5Cl_2$ or mixtures thereof which, for example, are described as being advantageous for the reaction of $CF_3CCl_3$ (German Auslegeschrift No. 1,917,630) are not required.

The reaction pressure is not critical for the process of the invention; in order to be able to operate with simple equipment, however, atmospheric pressure is recommended. It is advantageous to choose those temperatures which at the pressure applied, are above the boiling point of the fluorine containing carbonyl dihalide obtained.

According to the invention, the reaction of the perhalomethanes of formula II in the case where Y and Z each are bromine proceeds with $SO_3$ alone. In all other cases, however, the presence of catalysts of mono- or bivalent heavy metal salts, preferably Hg(I) or HF(II) salts or mixtures thereof, or the presence of sulfuric acid, that is, oleum, is required, since only then does the reaction proceed with sufficient speed. Especially suitable are mixtures of Hg(II) salts with Hg(I) salts or salts of $AG^+$, $Cu^{2+}$, $Pb^{2+}$. As Hg catalysts there are used above all the chlorides and/or sulfates, but also the oxides and other salts which react with $SO_3$ to form sulfates. They are employed in amounts of from 0.2 to 5 percent, preferably from 0.5 to 2 percent, relative to the perhalo-methane. The concentration of $SO_3$ in the oleum is not critical; preferably, a 20 to 65 percent oleum is empolyed.

Since one mole of perhalo-methane of formula II reacts with one mole of $SO_3$ to form the carbonyl compound $COFX + SO_2 YZ$, the equivalent amount of $SO_3$ is generally sufficient, especially in the upper range of temperatures. In order to increase the yield, however, it is advantageous to use an excess of 20 to 200 mole % or more of $SO_3$, preferably of from 50 to 100 mole %, relative to the perhalomethane in the case of employing oleum and an excess of more than 100 percent, especially from 200 to 400 mole % or more, in the case of using $SO_3$ per se. The nonreacted $SO_3$ remains in the sump after distillation of the reaction product and can be reused.

Normally, the sequence of introducing the reactants into the vessel is not critical, a preferred mode of operation being that in which $SO_3$ is introduced together with one of the cited catalysts or together with sulfuric acid (in the form of oleum), and the perhalomethane of formula II is added or fed in at reaction temperature, and the carbonyl dihalide of formula I escapes in gaseous form. This gas may then be worked up according to known methods, for example by liberating it as far as possible, by means of a cooling system, from $SO_2Cl_2$ or $SO_2$ or $Br_2$ carried along, and by obtaining the pure product by fractional distillation. $Br_2$ may also be eliminated by passing the gaseous carbonyl dihalide over heated antimony or by addition (with exposure to light) to trichloro-ethylene.

A special advantage of the process of the invention resides in the fact that the use of elementary fluorine or hydrogen fluoride and thus the special technology involved are not required, and that uniform products are directly obtained and not mixtures of different dihalides as in the case of most of the known processes.

Carbonyl difluoride, carbonyl chloride-fluoride and carbonyl bromide-fluoride are interesting intermediate products for the preparation of fluorine-containing compounds. With alcohols and phenols, for example, they form fluoroformic acid alkyl and aryl ester according to the following equation:

$$ROH + COFX \rightarrow ROCOF + HX$$

$X = F, Cl, Br$ some of which esters (for example tert.-butyl ester) are interesting compounds for introducing protective groups in the synthesis of polypeptides. The carbonyl bromide-fluoride, which is easily obtainable according to the process of the invention, is superior to $COF_2$ and $COFCl$ in that, because of the considerable differences of reactivity of bromine and fluorine, the yields of ROCOF are increased and the formation of organic carbonates as by-products remains insignificant.

The following examples illustrate the invention.

EXAMPLE 1

455 g of 56 % oleum (3.7 moles of $SO_3$) were introduced into a 1 liter round bottom flask provided with thermometer, dipping tube with attached dropping funnel, and two Dimroth coolers mounted one on top of the other, one of which was maintained at the temperature of the cooling water, the other at $-20°C$, and the oleum was maintained at a temperature of from 24° to 30°C. 275 g (2 moles) of monofluorotrichloromethane were added within 2 hours to the magnetically stirred oleum via the dropping funnel, which operation caused the immediate evolution of a gas which passed through both the coolers and was condensed in a trap cooled with $CO_2$/methylene chloride. Contents of the trap: 136 g.

| Composition: | inert gas | 1.9 weight % |
|---|---|---|
| | $CO_2$ | 5.5 weight % |
| | COFCl | 83.0 weight % |
| | $CFCl_3$ | 9.7 weight % |

The conversion rate of $CFCl_3$ was 75 weight %, the yield of COFCl in the converted $CFCl_3$ was 94 weight %.

EXAMPLE 2

455 g of 65 % oleum were introduced into the apparatus described in Example 1, and maintained at a temperature of from 6° to 80°C. 275 g (2 moles) of monofluoro-trichloromethane were added within 2 hours, and the evolved gas was condensed in a trap. Contents of the trap: 166 g.

In the subsequent fractional distillation, a fraction having a boiling point of $-38°$ to $-42°C$ was collected (129 g), which had the following analysis results:

| inert gas | 1 weight % |
|---|---|
| $CO_2$ | 2 weight % |
| COFCl | 97 weight % |
| $CFCl_3$ | 0.3 weight % |

The conversion rate of $CFCl_3$ was 78 weight %, the yield of COFCl in the converted $CFCl_3$ 98 weight %.

EXAMPLE 3

320 g (4 moles) of $SO_3$ and 1 g each of $HgSO_4$ and $Hg_2SO_4$ were maintained in the apparatus described in Example 1 at a temperature of from 40° to 60°C by means of an oil bath. 137.5 g (1 mole) of $CFCl_3$ were added dropwise within 2.5 hours, and the gas evolved vigorously was condensed in a trap (74 g).

| Composition: | inert gas | 5.8 weight % |
|---|---|---|
| | $CO_2$ | 1.2 weight % |
| | COFCl | 82.0 weight % |
| | $CFCl_3$ | 9.7 weight % |

The conversion rate of $CFCl_3$ was 79 weight %, the yield of COFCl in the converted $CFCl_3$ 99 weight %.

EXAMPLE 4

200 g (2.5 moles) of $SO_3$ were introduced into a 500 ml three-necked flask provided with thermometer, dropping funnel, magnetic agitator and two Dimroth coolers mounted one on top of the other, one of which was maintained at the temperature of the cooling water and the other at 0°C, and the charge was maintained at a temperature of from 37° to 42°C. 135 g (0.5 mole) of monofluoro-tribromo-methane were added dropwise within 2 hours, which caused the development of a gas and the reaction zone became filled with bromine vapors. While the bromine was substantially held back by the coolers, the other gaseous substances left the coolers, bubbled through a washing bottle irradiated by ultraviolet light and containing trichloroethylene for absorbing the entrained bromine, and were condensed in a trap (80 g). In the subsequent fractionation, 60 g passed over at a temperature up to $-10°C$, which fraction showed the following composition:

| $CO_2$ | 2.6 weight % |
|---|---|
| COFBr | 68.0 weight % |
| $SO_2$ | 29.5 weight % |

The yield of COFBr was 64 weight %, relative to the fluorotribromomethane used.

EXAMPLE 5

At a temperature of from 35° to 44°C, 105 g (0.5 mole) of difluorodibromomethane were added dropwise within 2 hours to 200 g (2.5 moles) of $SO_3$ in the apparatus described in Example 4. The gases evolved were condensed in a trap cooled with liquid oxygen (43.5 g).

| Composition: | $CO_2$ | 6.6 weight % |
|---|---|---|
| | $COF_2$ | 48.0 weight % |
| | $SO_2$ | 42.0 weight % |
| | $CF_2Br_2$ | 2.5 weight % |

The yield of $COF_2$ was 63 weight %, relative to the difluoro-dibromomethane used.

What is claimed is:

1. A process for the preparation of carbonyl dihalides of the formula

COFX (I)

wherein X is fluorine, chlorine or bromine, which comprises reacting a perhalomethane of the formula

CFXYZ (II)

where X is fluorine, chlorine or bromine, Y and Z each are chlorine and/or bromine with the restriction that if X is fluorine Y and/or Z are bromine, and if X is bromine Y and Z are also bromine, with sulfur trioxide in the presence of sulfuric acid or a catalyst consisting essentially of mono- or bivalent mercury salts or mixtures thereof, at a temperature of from −10° to +100°C.

2. A process as claimed in claim 1, wherein the reaction is carried out in the presence of sulfuric acid.

3. A process for the preparation of carbonyl dihalides of the formula

COFX (I)

wherein X is fluorine, chlorine or bromine, which comprises reacting a perhalomethane of the formula

CFXYZ (II)

wherein X is fluorine, chlorine or bromine, and Y and Z are both bromine, with sulfur trioxide at a temperature of from −10° to +100°C.

* * * * *